(12) United States Patent
Waku et al.

(10) Patent No.: US 8,911,326 B2
(45) Date of Patent: Dec. 16, 2014

(54) AUTOMATIC TRANSMISSION AND HYDRAULIC CONTROL METHOD THEREFOR

(75) Inventors: Kousuke Waku, Hadano (JP); Hideshi Wakayama, Hadano (JP); Masayuki Miyazono, Isehara (JP); Keichi Tatewaki, Atsugi (JP); Seiichiro Takahashi, Isehara (JP); Yuzuru Tohta, Sagamihara (JP); Takashi Matsuda, Isehara (JP); Daisuke Matsumoto, Sagamihara (JP)

(73) Assignees: Jatco Ltd, Fuji-shi (JP); Nissan Motor Co., Ltd., Yokohama-shi (JP)

( * ) Notice: Subject to any disclaimer, the term of this patent is extended or adjusted under 35 U.S.C. 154(b) by 226 days.

(21) Appl. No.: 13/576,544

(22) PCT Filed: Jan. 26, 2011

(86) PCT No.: PCT/JP2011/051486
§ 371 (c)(1),
(2), (4) Date: Aug. 1, 2012

(87) PCT Pub. No.: WO2011/111431
PCT Pub. Date: Sep. 15, 2011

(65) Prior Publication Data
US 2012/0302402 A1 Nov. 29, 2012

(30) Foreign Application Priority Data
Mar. 9, 2010 (JP) .................................. 2010-052372

(51) Int. Cl.
*F16H 61/26* (2006.01)
*F16H 61/00* (2006.01)
*F16H 61/662* (2006.01)
*F16H 37/02* (2006.01)

(52) U.S. Cl.
CPC .......... *F16H 61/0031* (2013.01); *F16H 37/022* (2013.01); *F16H 61/66272* (2013.01); *F16H 2312/14* (2013.01)
USPC ..................................................... 477/158

(58) Field of Classification Search
USPC ............... 477/174, 175, 180, 5, 8, 18, 77, 84, 477/115, 116, 127, 156, 158, 159, 902
See application file for complete search history.

(56) References Cited

U.S. PATENT DOCUMENTS 6,799,109 B2 9/2004 Nakamori et al.
8,465,392 B2 * 6/2013 Allgaier et al. ................... 477/3
(Continued)

FOREIGN PATENT DOCUMENTS

EP 1 995 497 A1 11/2008
JP 2002-106380 A 4/2002
(Continued)

OTHER PUBLICATIONS

Office Action received in Russian Application No. 2012142838 issued on Sep. 9, 2013.

*Primary Examiner* — Justin Holmes
(74) *Attorney, Agent, or Firm* — Foley & Lardner LLP (57) ABSTRACT

A transmission controller operates an electrical oil pump in a steady mode, in which an operating load of the electrical oil pump is set at a steady load, during an idle stop, but operates the electrical oil pump in a high-pressure mode, in which the operating load of the electrical oil pump is higher than the steady load, for a predetermined period when an engine stops rotating.

17 Claims, 7 Drawing Sheets

(56) References Cited

U.S. PATENT DOCUMENTS

2003/0171867 A1 9/2003 Nakamori et al.
2007/0173370 A1 7/2007 Kanayama et al.
2009/0177361 A1 7/2009 Muller et al.

FOREIGN PATENT DOCUMENTS

| JP | 2003-240110 A | 8/2003 |
| JP | 2010-014168 A | 1/2010 |
| JP | 2010-047099 A | 3/2010 |

* cited by examiner

AUTOMATIC TRANSMISSION AND HYDRAULIC CONTROL METHOD THEREFOR

TECHNICAL FIELD

The present invention relates to an automatic transmission and particularly to an automatic transmission to be combined with an engine which performs an idle stop.

BACKGROUND ART

A technology for improving fuel economy and exhaust performance by automatically stopping (idle stop) an engine while a vehicle is stopped has been put to practical use.

Since a mechanical oil pump cannot be driven by power of the engine while the engine is automatically stopped in a vehicle adopting this technology, a hydraulic pressure necessary at startup cannot be supplied from the mechanical oil pump to a starting frictional engagement element of the automatic transmission (brake, clutch to be engaged at startup) and the starting frictional engagement element is set in a non-engaged state. In this case, even if it is tried to start the vehicle in response to a start request, the engagement of the starting frictional engagement element is delayed, wherefore the vehicle cannot be quickly started.

Thus, in JP2002-106380A, an electrical oil pump which is driven by electric power supplied from a battery is separately provided to supply a hydraulic pressure produced by the electrical oil pump to the starting frictional engagement element while the engine is automatically stopped.

SUMMARY OF INVENTION

If the hydraulic pressure supplied to the starting frictional engagement element during the idle stop is controlled in advance to be a hydraulic pressure at which the starting frictional engagement element starts generating a transmission capacity, the transmission capacity of the starting frictional engagement element can be increased without delay and the vehicle can be quickly started in the case of a start request.

However, there are cases where the engine slightly rotates in a reverse direction immediately after the rotation (forward rotation) thereof is stopped due to a force of compressed air in a combustion chamber to push back pistons and the weight of the pistons. In such cases, the hydraulic pressure supplied to the starting frictional engagement element is sucked by the mechanical oil pump which rotates in the reverse direction together with the engine and the supply of the hydraulic pressure to the starting frictional engagement element temporarily drops. If a start request is made at this timing, it takes a longer time until the transmission capacity of the starting frictional engagement element increases, whereby starting performance of the vehicle decreases.

The present invention aims to obtain good starting performance even if a start request is made at a timing at which a hydraulic pressure supplied to a starting frictional engagement element drops by reducing a drop of the hydraulic pressure supplied to the starting frictional engagement element caused by the reverse rotation of an engine occurring immediately after the engine stops rotating.

One aspect of the present invention is directed to an automatic transmission to be combined with an engine which performs an idle stop, comprising a mechanical oil pump which is driven by power of the engine; an electrical oil pump; a starting frictional engagement element to which a hydraulic pressure produced in the mechanical oil pump or the electrical oil pump is supplied; and an idle stop associated hydraulic control unit which operates the electrical oil pump in a steady mode, in which an operating load of the electrical oil pump is set at a steady load, during the idle stop, but operates the electrical oil pump in a high-pressure mode, in which the operating load of the electrical oil pump is set at a load higher than the steady load, at least while the hydraulic pressure supplied to the starting frictional engagement element drops due to the reverse rotation of the engine occurring immediately after the engine stops rotating.

Another aspect of the present invention is directed to a hydraulic control method for an automatic transmission to be combined with an engine which performs an idle stop and including a mechanical oil pump which is driven by power of the engine, an electrical oil pump, and a starting frictional engagement element to which a hydraulic pressure produced in the mechanical oil pump or the electrical oil pump is supplied, wherein the electrical oil pump is operated in a steady mode, in which an operating load of the electrical oil pump is set at a steady load, during the idle stop, but is operated in a high-pressure mode, in which the operating load of the electrical oil pump is set at a load higher than the steady load, for a predetermined period when the engine stops rotating.

According to these aspects, a drop of the hydraulic pressure supplied to the starting frictional engagement element caused by the reverse rotation of the engine can be reduced. In this way, a transmission capacity of the starting frictional engagement element can be increased and good starting performance can be obtained by quickly increasing the hydraulic pressure supplied to the starting frictional engagement element even if a start request is made at a timing at which the hydraulic pressure supplied to the starting frictional engagement element drops.

An embodiment of the present invention and advantages thereof are described in detail below with reference to the accompanying drawings.

DESCRIPTION OF EMBODIMENTS

In the following description, a "speed ratio" of a certain transmission mechanism is a value obtained by dividing an input rotation speed of this transmission mechanism by an output rotation speed thereof. Further, a "lowest speed ratio" means a maximum speed ratio of this transmission mechanism and a "highest speed ratio" means a minimum speed ratio thereof.

Figure 1:
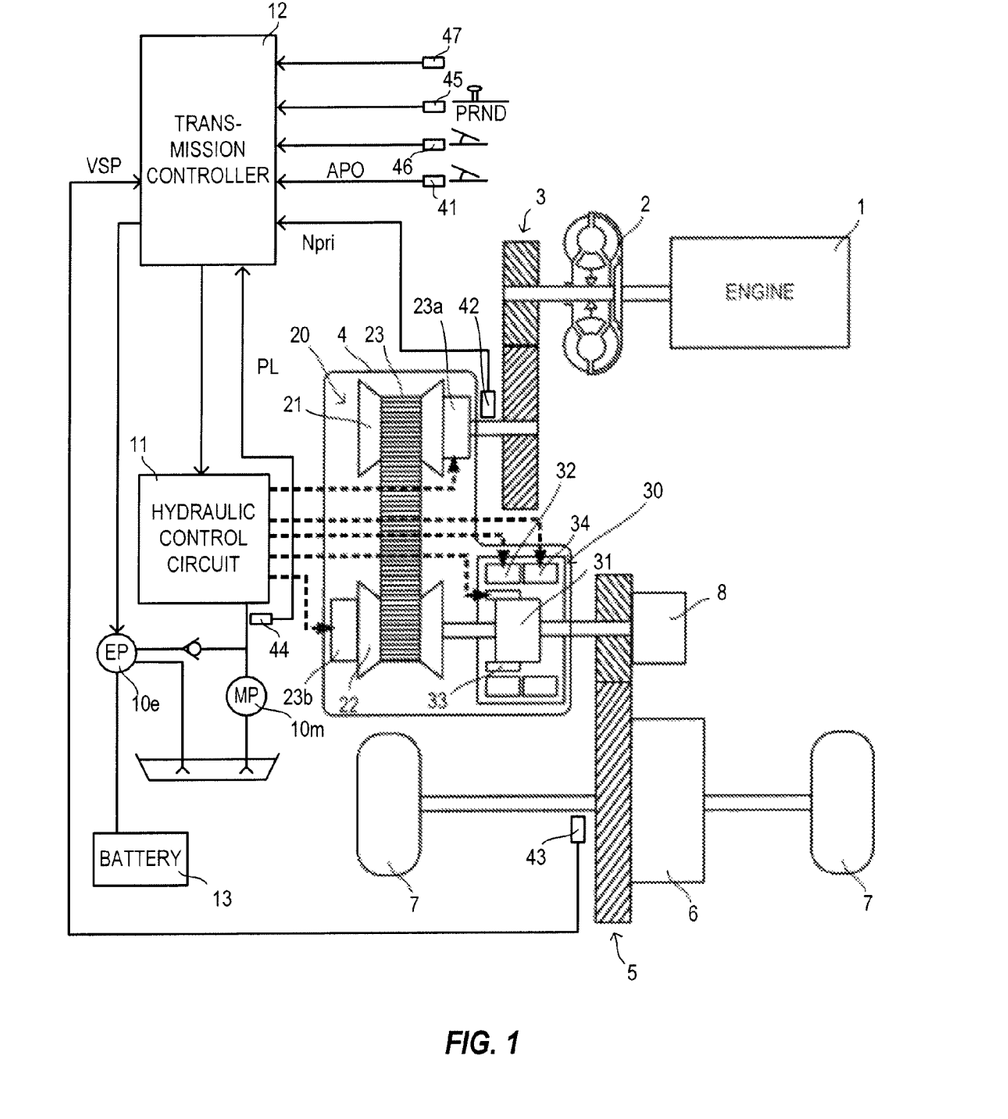
FIG. 1 is a schematic configuration diagram of a vehicle equipped with an automatic transmission according to an embodiment of the present invention.

FIG. 1 is a schematic configuration diagram of a vehicle equipped with an automatic transmission according to an embodiment of the present embodiment. This vehicle includes an engine 1 as a drive source. Output rotation of the engine 1 is transmitted to drive wheels 7 via a torque converter 2 with a lock-up clutch, a first gear train 3, a continuously variable transmission (hereinafter, merely referred to as a "transmission 4"), a second gear train 5 and a final gear unit 6. The second gear train 5 includes a parking mechanism 8 for mechanically locking an output shaft of the transmission 4 in a vehicle parked state so as not to be able to rotate.

The engine 1 is an engine with an idle stop function which automatically cuts fuel supply and stops when a predetermined idle stop condition holds when the vehicle is stopped. The idle stop condition holds, for example, when the vehicle is stopped with a brake set in an ON-state, the warm-up of the engine 1 and the transmission 4 has been completed and the remaining charge of a battery 13 is sufficient.

The transmission 4 includes a mechanical oil pump 10m to which the rotation of the engine 1 is input and which is driven using a part of power of the engine 1 and an electrical oil pump 10e which is driven by the supply of power from a battery 13. The electrical oil pump 10e includes an oil pump body, an electric motor and a motor driver for driving and rotating the oil pump body and can control an operating load to be an arbitrary load or in multiple stages in response to a drive signal transmitted from a transmission controller 12 to be described later. Specifically, the operating load (operation mode) of the electrical oil pump 10e is controlled based on an instruction current to the electrical oil pump 10e. For example, a switch from a steady mode to a high-pressure mode to be described later is made by setting an instruction current to the electrical oil pump 10e at an instruction current higher than that in the steady mode. The transmission 4 further includes a hydraulic control circuit 11 for adjusting a hydraulic pressure (hereinafter, referred to as a "line pressure PL") from the mechanical oil pump 10m or the electrical oil pump 10e and supplying the adjusted hydraulic pressure to each component of the transmission 4, and the transmission controller 12 for controlling the hydraulic control circuit 11.

The transmission 4 includes a V-belt continuously variable transmission mechanism (hereinafter, referred to as a "variator 20") and a sub-transmission mechanism 30 provided in series with the variator 20. "To be provided in series" means that the variator 20 and the sub-transmission mechanism 30 are provided in series in a power transmission path from the engine 1 to the drive wheels 7. The sub-transmission mechanism 30 may be directly connected to an output shaft of the variator 20 as in this example or may be connected via another transmission mechanism or power transmission mechanism (e.g. gear train). Alternatively, the sub-transmission mechanism 30 may be connected to a stage (input shaft side) preceding the variator 20.

The variator 20 includes a primary pulley 21, a secondary pulley 22 and a V-belt 23 mounted between the pulleys 21 and 22. Each of the pulleys 21, 22 includes a fixed conical plate, a movable conical plate arranged such that a sheave surface faces toward the fixed conical plate and a V-groove is formed between the fixed conical plate and the movable conical plate, and a hydraulic cylinder 23a, 23b provided on the back surface of this movable conical plate for displacing the movable conical plate in an axial direction. When hydraulic pressures supplied to the hydraulic cylinders 23a, 23b are adjusted, the widths of the V-grooves change to change contact radii of the V-belt 23 and each of the pulleys 21, 22, whereby a speed ratio of the variator 20 continuously changes.

The sub-transmission mechanism 30 is a transmission mechanism with two forward speeds and one reverse speed. The sub-transmission mechanism 30 includes a Ravigneaux-type planetary gear mechanism 31 in which carriers of two planetary gears are coupled, and a plurality of frictional engagement elements (low brake 32, high clutch 33, rev brake 34) which are connected to a plurality of rotation elements constituting the Ravigneaux-type planetary gear mechanism 31 to change rotation states thereof. If hydraulic pressures supplied to each of the frictional engagement elements 32 to 34 are adjusted to change engaged and released states of each of the frictional engagement elements 32 to 34, a gear position of the sub-transmission mechanism 30 is changed.

For example, the sub-transmission mechanism 30 is set to a first gear position if the low brake 32 is engaged and the high clutch 33 and the rev brake 34 are released. The transmission mechanism 30 is set to a second gear position having a smaller speed ratio than the first gear position if the high clutch 33 is engaged and the low brake 32 and the rev brake 34 are released. Further, the sub-transmission mechanism 30 is set to a reverse gear position if the rev brake 34 is engaged and the low brake 32 and the high clutch 33 are released. In the following description, a case where the sub-transmission mechanism 30 is in the first gear position is expressed by that "the transmission 4 is in a low-speed mode" and a case where the sub-transmission mechanism 30 is in the second gear position is expressed by that "the transmission 4 is in a high-speed mode".

Figure 2:
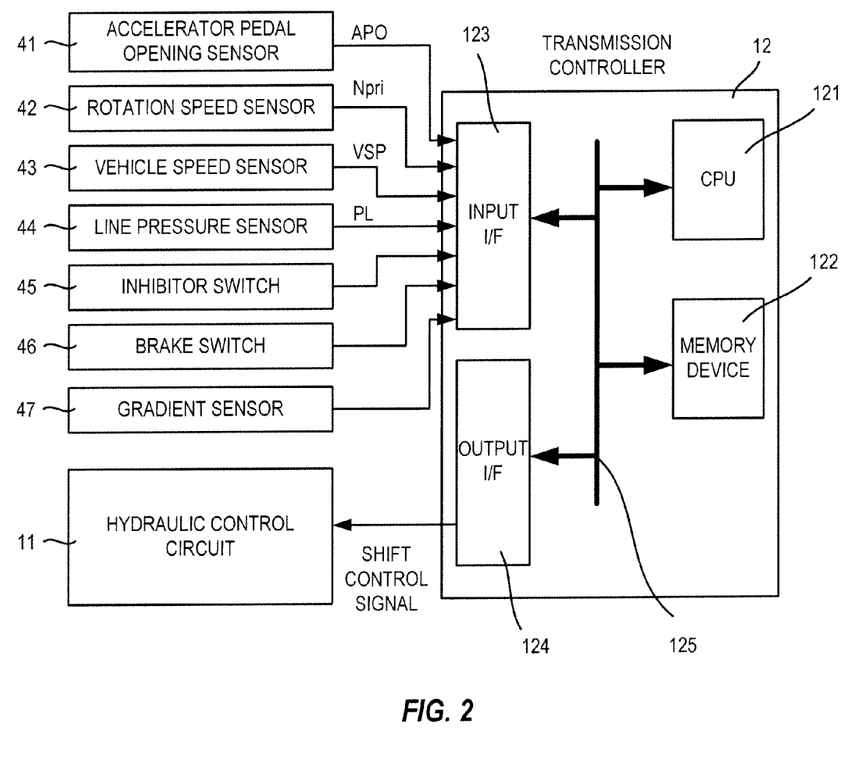
FIG. 2 is a diagram showing the internal configuration of a transmission controller.

The transmission controller 12 includes a CPU 121, a memory device 122 composed of a RAM/ROM, an input interface 123, an output interface 124 and a bus 125 which connects these components to each other as shown in FIG. 2.

To the input interface 123 are input an output signal of an accelerator pedal opening sensor 41 for detecting an accelerator pedal opening APO which is an operation amount of an accelerator pedal, an output signal of a rotation speed sensor 42 for detecting an input rotation speed of the transmission 4 (=rotation speed of the primary pulley 21; hereinafter, referred to as a "primary rotation speed Npri"), an output signal of a vehicle speed sensor 43 for detecting a vehicle speed VSP, an output signal of a line pressure sensor 44 for detecting the line pressure PL, an output signal of an inhibitor switch 45 for detecting the position of a select lever, output signals of a brake switch 46 for detecting an operating state (ON/OFF) of a brake pedal and a gradient sensor 47 for detecting the gradient of a road surface on which the vehicle is presently running, a signal (e.g. fuel cut signal) from an unillustrated engine controller, and the like.

A transmission control program of the transmission 4, a shift map (FIG. 3) used in this transmission control program and a program of an idle stop associated hydraulic control to be described later are stored in the memory device 122. The CPU 121 reads the transmission control program stored in the memory device 122 and implements it to generate a shift control signal and a drive signal for the electrical oil pump 10e by performing various arithmetic processings on various signals input via the input interface 123, and outputs the generated signals to the hydraulic control circuit 11 and the motor driver of the electrical oil pump 10e via the output interface 124. Various values used in the arithmetic processings by the CPU 121 and calculation results thereof are appropriately stored in the memory device 122.

The hydraulic control circuit 11 is composed of a plurality of flow paths and a plurality of hydraulic control valves. The hydraulic control circuit 11 switches a hydraulic pressure supply path, prepares a necessary hydraulic pressure from a hydraulic pressure produced in the oil pump 10 and supplies this to each component of the transmission 4 by controlling the plurality of hydraulic control valves based on the shift control signal from the transmission controller 12. In this way, the speed ratio of the variator 20 and the gear position of the sub-transmission mechanism 30 are changed, whereby the transmission 4 is shifted.

Figure 3:
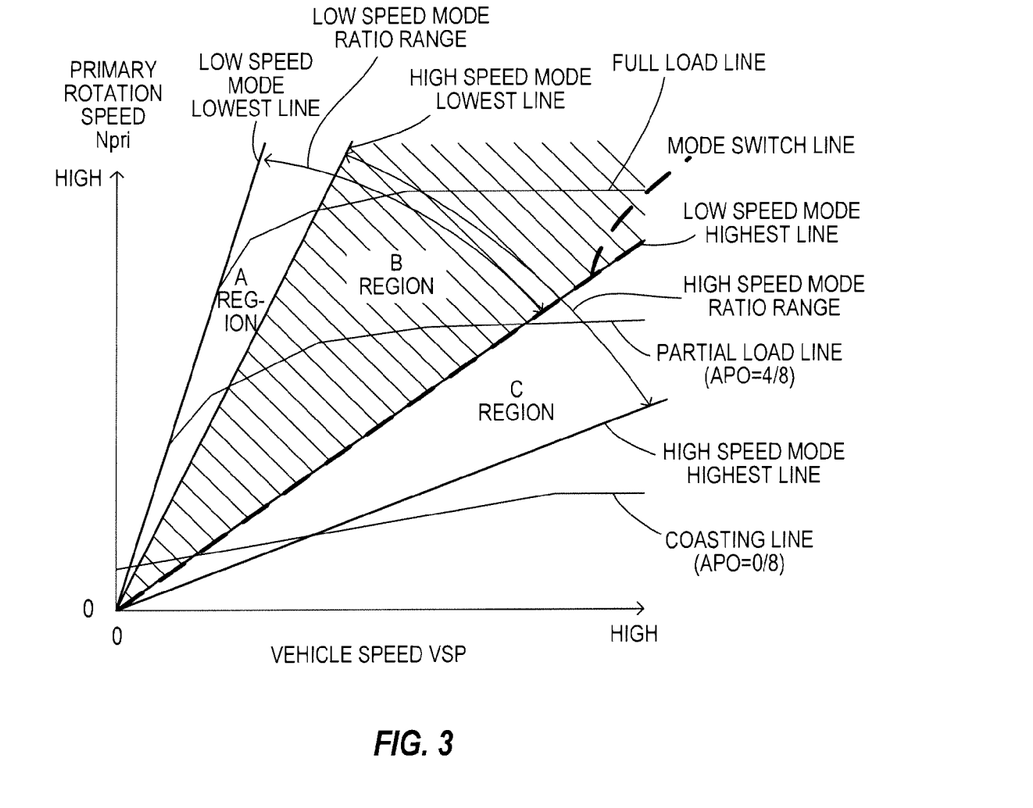
FIG. 3 is a graph showing an example of a shift map.

FIG. 3 shows an example of the shift map stored in the memory device 122. The transmission controller 12 controls the variator 20 and the sub-transmission mechanism 30 according to an operating condition of the vehicle (vehicle speed VSP, primary rotation speed Npri, accelerator pedal opening APO in this embodiment) based on this shift map.

On this shift map, an operating point of the transmission 4 is defined by the vehicle speed VSP and the primary rotation speed Npri. The inclination of a line connecting the operating point of the transmission 4 and a zero point on the lower left corner of the shift map corresponds to the speed ratio of the transmission 4 (overall speed ratio obtained by multiplying the speed ratio of the variator 20 by the speed ratio of the sub-transmission mechanism 30; hereinafter, referred to as a "through speed ratio"). In this shift map, a shift line is set for each accelerator pedal opening APO similar to a shift map of a conventional V-belt continuously variable transmission, and the transmission 4 is shifted in accordance with the shift line selected based on the accelerator pedal opening APO. For simplicity, only a full load line (shift line when the accelerator pedal opening APO=8/8), a partial load line (shift line when the accelerator pedal opening APO=4/8) and a coast line (shift line when the accelerator pedal opening APO=0/8) are shown in FIG. 3.

When being in the low-speed mode, the transmission 4 can be shifted between a low-speed mode lowest line obtained by setting the speed ratio of the variator 20 at the lowest speed ratio and a low-speed mode highest line obtained by setting the speed ratio of the variator 20 at the highest speed ratio. In this case, the operating point of the transmission 4 moves in areas A and B. On the other hand, when being in the high-speed mode, the transmission 4 can be shifted between a high-speed mode lowest line obtained by setting the speed ratio of the variator 20 at the lowest speed ratio and a high-speed mode highest line obtained by setting the speed ratio of the variator 20 at the highest speed ratio. In this case, the operating point of the transmission 4 moves in areas B and C.

The speed ratio of each gear position of the sub-transmission mechanism 30 is set so that the speed ratio corresponding to the low-speed mode highest line (low-speed mode highest speed ratio) is smaller than the speed ratio corresponding to the high-speed mode lowest line (high-speed mode lowest speed ratio). By this, a range of the through speed ratio of the transmission 4 that can be set in the low-speed mode (low-speed mode ratio range in FIG. 3) and a range of the through speed ratio of the transmission 4 that can be set in the high-speed mode (high-speed mode ratio range in FIG. 3) partly overlap. The transmission 4 can be selectively set in either one of the low-speed mode and the high-speed mode when the operating point of the transmission 4 is in the area B defined between the high-speed mode lowest line and the low-speed mode highest line.

On this shift map, a mode switch shift line at which the sub-transmission mechanism 30 is shifted is so set as to overlap the low-speed mode highest line. A through speed ratio corresponding to the mode switch shift line (hereinafter, referred to as a "mode switch speed ratio mRatio") is set at a value equal to the low-speed mode highest speed ratio. The mode switch shift line is set in this manner because an input torque to the sub-transmission mechanism 30 decreases and a shift shock in shifting the sub-transmission mechanism 30 is suppressed as the speed ratio of the variator 20 decreases.

When the operating point of the transmission 4 crosses the mode switch shift line, i.e. an actual value of the through speed ratio (hereinafter, referred to as an actual through speed ratio Ratio) changes over the mode switch speed ratio mRatio, the transmission controller 12 performs a synchronization shift to be described below to switch between the high-speed mode and the low-speed mode.

In the synchronization shift, the transmission controller 12 shifts the sub-transmission mechanism 30 and changes the speed ratio of the variator 20 in a direction opposite to a changing direction of the speed ratio of the sub-transmission mechanism 30. At this time, an inertia phase in which the speed ratio of the sub-transmission mechanism 30 actually changes and a period during which the speed ratio of the variator 20 is changed are synchronized. The speed ratio of the variator 20 is changed in the direction opposite to the changing direction of the speed ratio of the sub-transmission mechanism 30 to prevent a sense of discomfort from being given to a driver due to a change in input rotation caused by a discrete change of the actual through speed ratio Ratio.

Specifically, when the actual through speed ratio Ratio of the transmission 4 changes over the mode switch speed ratio mRatio from a Low side to a High side, the transmission controller 12 changes the gear position of the sub-transmission mechanism 30 from the first gear position to the second gear position (1-2 shift) and changes the speed ratio of the variator 20 to the Low side.

Conversely, when the actual through speed ratio Ratio of the transmission 4 changes over the mode switch speed ratio mRatio from the High side to the Low side, the transmission controller 12 changes the gear position of the sub-transmission mechanism 30 from the second gear position to the first gear position (2-1 shift) and changes the speed ratio of the variator 20 to the High side.

Since the engine 1 is an engine with an idle stop function, the transmission controller 12 executes an interlock control and an idle stop associated hydraulic control to be described below during the idle stop.

The interlock control is a control executed to prevent a shock and a sudden start caused when the rotation of the engine 1, which has revved up, is directly transmitted to the drive wheels 7 via the transmission 4 when the engine 1 is restarted in response to a start request (e.g. the brake is off). Specifically, the transmission controller 12 sets the transmission 4 in an interlock state where input and output shafts cannot rotate by engaging both the low brake 32 and the high clutch 33 during the idle stop when the select lever is in a forward range such as D-range and L-range.

This interlock state is continued until the engine 1 is restarted and the revved-up rotation is reduced to a predetermined idle rotation speed. The high clutch 33 may be released to release the interlock state.

The idle stop associated hydraulic control is a control executed to increase the hydraulic pressure (line pressure PL) supplied to the low brake 32 to be engaged at startup to a hydraulic pressure at which facings of facing friction elements of the low brake 32 are slightly in contact and the low brake 32 starts generating a transmission capacity (hydraulic pressure equivalent to pre-charging; hereinafter, referred to as a "starting required pressure Prtn) by operating the electrical oil pump 10e during the idle stop.

If the hydraulic pressure supplied to the low brake 32 is increased to the starting required pressure Prtn during the idle stop, it is possible to increase the transmission capacity of the low brake 32 at startup and quickly start the vehicle. The hydraulic pressure supplied to the low brake 32 is increased only to the starting required pressure Prtn to suppress deterioration in fuel economy and quietness and a reduction in the life of the electrical oil pump 10e caused by operating the electrical oil pump 10e at an operating load higher than necessary.

If an operating load L of the electrical oil pump 10e necessary to increase the hydraulic pressure supplied to the low brake 32 to the starting required pressure Prtn is a steady load Lnorm, the starting required pressure Prtn should be ensured by continuously operating the electrical oil pump 10e at this steady load Lnorm.

However, when the fuel supply to the engine 1 is cut and the rotation of the engine 1 is stopped by the idle stop, the engine 1 may be slightly rotated in a reverse direction due to a force of compressed air in a combustion chamber to push back pistons and a gravitational force acting on the pistons. In this case, the mechanical oil pump 10m rotates in a reverse direction to suck a part of the hydraulic pressure supplied to the low brake 32, whereby the line pressure PL becomes lower than the starting required pressure Prtn. If a drop of the line pressure PL at this time is large and a start request is made at this timing, a delay until the transmission capacity of the low brake 32 is increased at startup becomes larger and starting performance of the vehicle is affected.

Accordingly, in the idle stop associated hydraulic control, the electrical oil pump 10e is basically operated at the steady load Lnorm during the idle stop, but the operating load L of the electrical oil pump 10e is made larger than the steady load Lnorm to reduce the drop of the line pressure PL caused by the reverse rotation of the engine 1 at least while the line pressure PL drops due to the reverse rotation of the engine 1.

Ideally, the operating load L of the electrical oil pump 10e may be increased until a drop amount $\Delta Pdrp$ of the line pressure PL becomes zero. However, an allowable drop amount $\Delta Pallow$ differs depending on the vehicle condition during the idle stop and the operation of the electrical oil pump 10e at a high load leads to deterioration in fuel economy and quietness and a reduction in the life of the electrical oil pump. Thus, the amount, the start timing and the period of an increase of the operating load of the electrical oil pump 10e are changed according to the vehicle condition during the idle stop.

For example, when the vehicle is on an uphill road, a torque from a road surface is input to the transmission 4 in addition to a torque from the engine 1 at startup. Thus, the hydraulic pressure required by the low brake 32 at startup becomes higher. Further, when the transmission 4 is to be interlocked, supply destinations of the hydraulic pressure increase, whereby the amount of leakage also increases. Thus, both required oil amount and required hydraulic pressure increase. Therefore, when the vehicle is on an uphill road or when the transmission 4 is to be interlocked, the amount of the increase of the operating load L of the electrical oil pump 10e is increased, the increase start timing is advanced and the period during which the increase is continued is extended.

The idle stop associated hydraulic control executed by the transmission controller 12 is further described below with reference to FIGS. 4 and 5.

Figure 4:
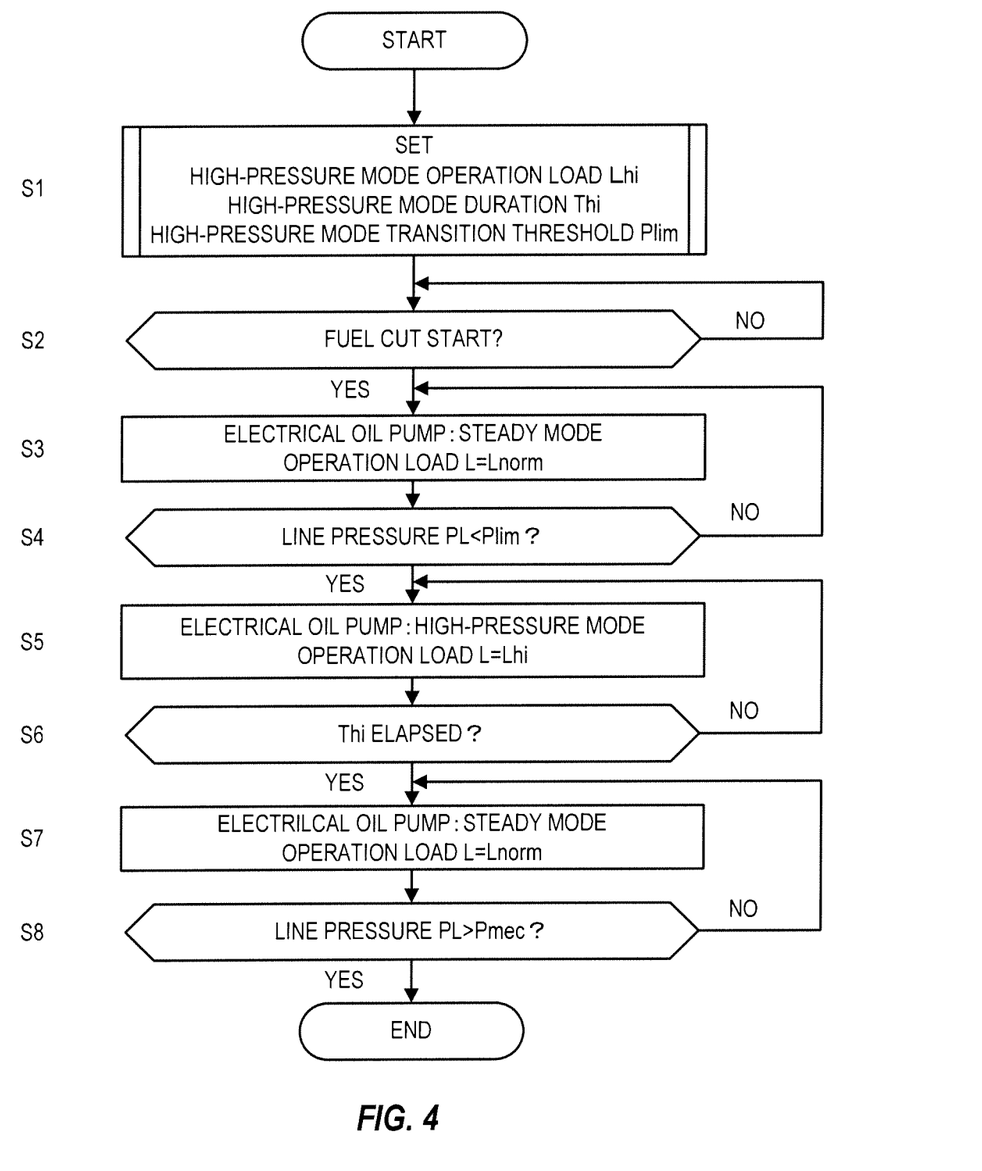
FIG. 4 is a flow chart showing contents of an idle stop associated hydraulic control executed by the transmission controller.

FIG. 4 is a main routine of the idle stop associated hydraulic control, which is executed when the idle stop condition holds.

This is described. First, in S1, the transmission controller 12 sets a high-pressure mode operating load Lhi which is the operating load L of the electrical oil pump 10e when the electrical oil pump 10e is operated in the high-pressure mode, a high-pressure mode duration Thi which is a period during which the high-pressure mode is continued, and a high-pressure mode transition threshold value Plim which is the line pressure PL when a switch is made from the steady mode to the high-pressure mode. Specifically, these values are respectively set by a subroutine shown in FIG. 5 according to the vehicle condition. Contents of the subroutine are described later.

In S2, the transmission controller 12 judges whether or not the fuel cut of the engine 1 has been started based on a fuel cut signal from the engine controller. The process proceeds to S3 if the start of the fuel cut is judged, otherwise judgment in S2 is repeated.

In S3, the transmission controller 12 starts operating the electrical oil pump 10e in the steady mode. The operating load L of the electrical oil pump 10e in the steady mode is the steady load Lnorm necessary to generate the starting required pressure Prtn that is the hydraulic pressure at which the low brake 32 starts generating the transmission capacity.

In S4, the transmission controller 12 judges whether or not the line pressure PL has fallen below the high-pressure mode transition threshold value Plim. Since the line pressure PL drops due to the reverse rotation of the engine 1 if the line pressure PL is below the high-pressure mode transition threshold value Plim, the process proceeds to S5 in which the operation mode of the electrical oil pump 10e is switched to the high-pressure mode.

Since the high-pressure mode transition threshold value Plim is set to be a higher value when the vehicle is on an uphill road or when the transmission 4 is to be interlocked than when the vehicle is on a flat road and the transmission 4 is not to be interlocked, the operation mode is switched from the steady mode to the high-pressure mode at an earlier timing in the former case than in the latter case. On the other hand, if the line pressure PL is not below the high-pressure mode transition threshold value Plim, the process returns to S3 and the operation of the electrical oil pump 10e in the steady mode is continued.

In S5, the transmission controller 12 increases the operating load L of the electrical oil pump 10e from the steady load Lnorm to the high-pressure mode operating load Lhi set in S1. In this way, a drop of the line pressure PL caused by the reverse rotation of the engine 1 is reduced and the drop amount $\Delta Pdrp$ is made smaller than the allowable drop amount $\Delta Pallow$.

When the vehicle is on an uphill road or the transmission 4 is to be interlocked, the allowable drop amount $\Delta Pallow$ of the line pressure PL caused by the reverse rotation of the engine 1 is smaller than when the vehicle is on a flat road and the transmission 4 is not to be interlocked. However, since the high-pressure mode operating load Lhi is set at a higher value in the former case than in the latter case as described later, the drop amount $\Delta Pdrp$ of the line pressure PL caused by the reverse rotation of the engine 1 is suppressed to be smaller than the allowable drop amount $\Delta Pallow$ even in these cases.

In S6, the transmission controller 12 judges whether or not the duration of the high-pressure mode has exceeded the high-pressure mode duration Thi set in S1. When the vehicle is on an uphill road or the transmission 4 is to be interlocked, the drop of the line pressure PL caused by the reverse rotation of the engine 1 needs to be smaller and more reliably suppressed than when the vehicle is on a flat road and the transmission 4 is not to be interlocked. Thus, in the former case, the high-pressure mode duration Thi is set at a larger value than in the latter case as described later, so that the high-pressure mode is continued for a longer time. This prevents the high-pressure mode from finishing while the line pressure PL is dropped.

The process proceeds to S7 if the high-pressure mode duration Thi has been exceeded, otherwise the process returns to S5 to continue the high-pressure mode.

In S7, the transmission controller 12 switches the operation mode of the electrical oil pump 10e to the steady mode, whereby the operating load L of the electrical oil pump 10e is reduced to the steady load Lnorm. Since the engine 1 does not basically rotate in the reverse direction except immediately after the engine 1 stops rotating, the starting required pressure Prtn can be ensured by operating the electrical oil pump 10e at the steady load Lnorm.

In S8, the transmission controller 12 judges whether or not the line pressure PL has exceeded a predetermined pressure Pmec. The predetermined pressure Pmec is set at a value capable of judging that the engine 1 is restarted and the mechanical oil pump 10m has started generating a sufficient hydraulic pressure. The process is finished if the line pressure PL is judged to have exceeded the predetermined pressure Pmec, otherwise the process returns to S7 to continue the steady mode.

Figure 5:
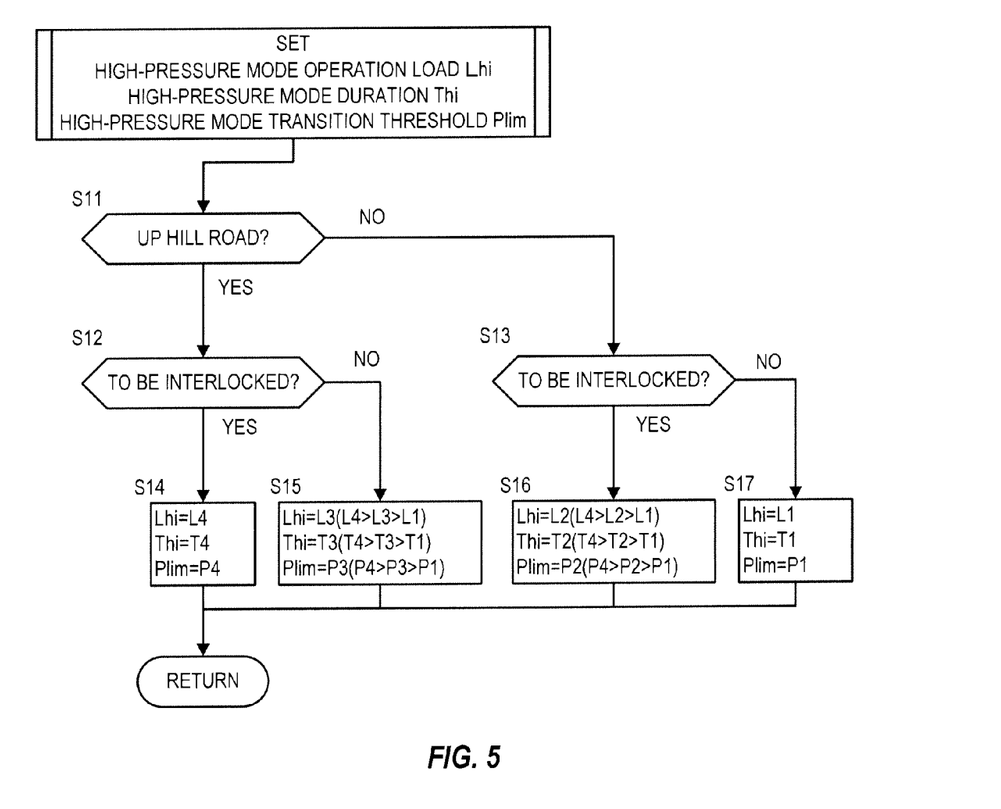
FIG. 5 is a flow chart showing contents of the idle stop associated hydraulic control executed by the transmission controller.

FIG. 5 is a subroutine executed in S1 of FIG. 4.

This is described. First, in S11 to S13, the transmission controller 12 judges whether or not the vehicle is on an uphill road (S11) and whether or not the transmission 4 is to be executed (S12, S13). Judgment as to whether or not the vehicle is on an uphill road is made based on an output signal from the gradient sensor 47. Judgment as to whether or not the transmission 4 is to be interlocked is made based on an output signal from the inhibitor switch 45. Specifically, it is judged that the transmission 4 is to be interlocked if the select lever is in a forward range, whereas it is judged that the transmission 4 is not to be interlocked if the select lever is in a range other than that. The process proceeds to any one of S14 to S17 according to judgment results in S11 to S13.

In S14 to S17, the transmission controller 12 sets the high-pressure mode operating load Lhi at a value of L1 to L4, the high-pressure mode duration Thi at a value of T1 to T4 and the high-pressure mode transition threshold value Plim at a value of P1 to P4 according to four patterns determined by whether or not the vehicle is on an uphill road and whether or not the transmission 4 is to be interlocked.

Any of L1 to L4 is a value higher than the steady load Lnorm of the electrical oil pump 10e. Any of T1 to T4 is a period longer than the duration of the drop of the line pressure PL caused by the reverse rotation of the engine 1 obtained in an experiment or the like. Any of P1 to P4 is a value higher than the starting required pressure Prtn. Any of the high-pressure mode operating load Lhi, the high-pressure mode duration Thi and the high-pressure mode transition threshold value Plim takes a maximum value L4, T4, P4 when the vehicle is on an uphill road and the transmission 4 is to be interlocked while taking a minimum value L1, T1, P1 when the vehicle is on a flat road and the interlock is not to be performed. That is, the following relationships hold among L1 to L4, T1 to T4 and P1 to P4:

L4>L3, L2>L1,
T4>T3, T2>T1, and
P4>P3, P2>P1.

Magnitude relationships of L2, T2, P2 and L3, T3, P3 are determined by a magnitude relationship of the allowable drop amount ΔPallow when the vehicle is on an uphill road and that when the transmission 4 is to be interlocked.

Accordingly, in a specific vehicle condition where the allowable drop amount ΔPallow decreases, i.e. in a vehicle condition where the vehicle is on an uphill road and/or the transmission 4 is to be interlocked (S14 to S16), the electrical oil pump 10e is switched to the high-pressure mode at an earlier timing to increase the increase amount of the operating load of the electrical oil pump 10e in the high-pressure mode and make the duration of the high-pressure mode longer than in a vehicle condition where the vehicle is on a flat road and the transmission 4 is not to be interlocked (S17).

Since the allowable drop amount ΔPallow of the line pressure PL becomes smallest if the vehicle is on an uphill road and the transmission 4 is to be interlocked (S14), the high-pressure mode is switched at an earliest timing, the increase amount of the operating load of the electrical oil pump 10e is made largest and the high-pressure mode is continued for a longest period in the above specific vehicle condition.

Figure 6:
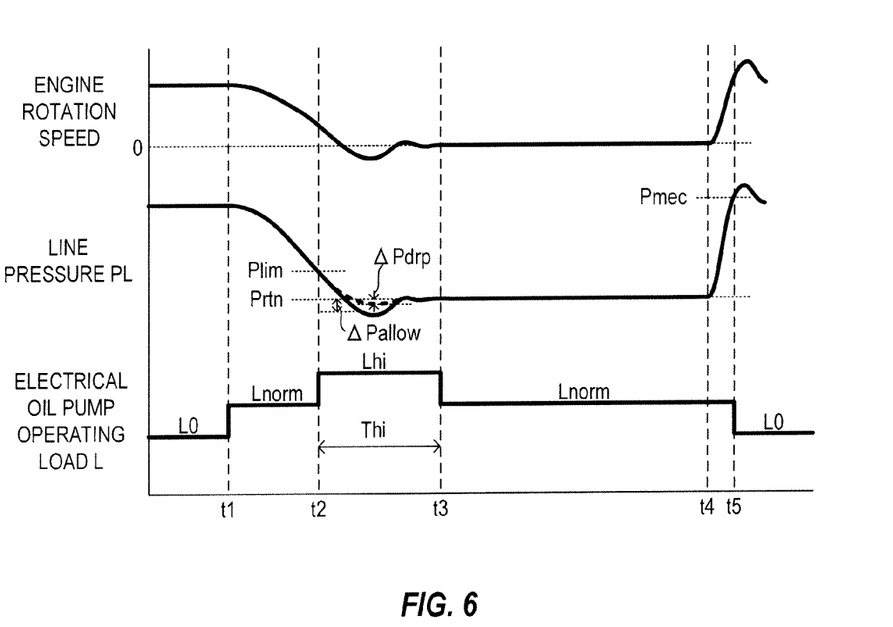
FIG. 6 is a timing chart showing functions and effects of the present invention.

FIG. 6 shows an operating condition of the electrical oil pump 10e while the idle stop of the engine 1 is performed.

When the idle stop condition holds and the fuel cut of the engine 1 is started at time t1, the operating load L of the electrical oil pump 10e increases from a standby load L0 to the steady load Lnorm in the steady mode and the electrical oil pump 10e starts operating. The operating load L of the electrical oil pump 10e in the steady mode is the steady load Lnorm at which the starting required pressure Prtn is obtained. Since the rotation speed of the engine 1 decreases and the discharge pressure of the mechanical oil pump 10m decreases, the line pressure PL decreases with the passage of time (time t1 to t2).

When the line pressure PL becomes lower than the high-pressure mode transition threshold value Plim at time t2, the operation mode of the electrical oil pump 10e is switched from the steady mode to the high-pressure mode in preparation for a drop of the line pressure PL caused by the reverse rotation of the engine 1. The operating load L of the electrical oil pump 10e in the high-pressure mode is set at the load Lhi higher than the steady load Lnorm at which the starting required pressure Prtn is obtained. When the operation mode of the electrical oil pump 10e is switched to the high-pressure mode, the rotation speed of the electrical oil pump 10e increases and a discharge flow rate of the electrical oil pump 10e increases.

Thereafter, the line pressure PL drops and becomes lower than the starting required pressure Prtn due to the reverse rotation of the engine 1 immediate after the engine 1 stops rotating (time t2 to t3). However, since the electrical oil pump 10e is switched to the high-pressure mode and the discharge flow rate of the electrical oil pump 10e increases at time t2, a drop (broken line) of the line pressure PL becomes smaller than a drop (solid line) when the electrical oil pump 10e remains operating in the steady mode and the drop amount ΔPdrp of the line pressure PL is suppressed to be smaller than the allowable drop amount ΔPallow determined by the vehicle condition.

The high-pressure mode of the electrical oil pump 10e is continued at least for the high-pressure mode duration Thi longer than a period during which the line pressure PL drops due to the reverse rotation of the engine 1 (time t2 to t3), and the high-pressure mode does not end while the line pressure PL is dropped.

When the engine 1 is restarted in response to a start request at time t4, the drive of the mechanical oil pump 10m by the engine 1 is started. When the line pressure PL exceeds the predetermined pressure Pmec at time t5, the idle stop associated hydraulic control is finished by reducing the operating load L of the electrical oil pump 10e to the standby load L0 and zeroing the discharge pressure of the electrical oil pump 10e.

Figure 7:
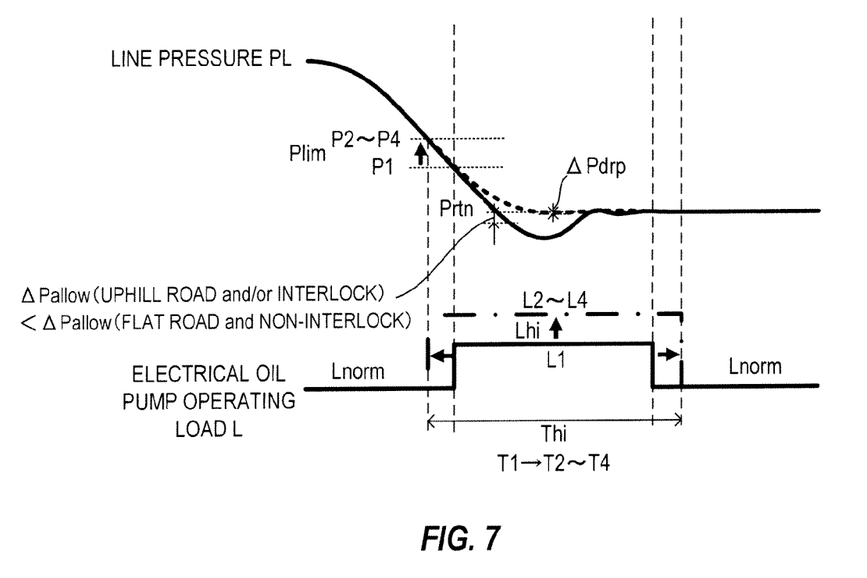
FIG. 7 is a timing chart showing functions and effects of the present invention.

FIG. 7 shows a state where the high-pressure mode operating load Lhi, the high-pressure mode duration Thi and the high-pressure mode transition threshold value Plim are changed when the vehicle is on an uphill road or when the transmission 4 is to be interlocked.

In the specific vehicle condition where the vehicle is on an uphill road or the transmission 4 is to be interlocked, the allowable drop amount ΔPallow of the line pressure PL is smaller than when the vehicle is on a flat road or when the transmission 4 is not to be interlocked. According to the above idle stop associated hydraulic control, the electrical oil pump 10e is switched to the high-pressure mode at an earlier timing, the increase amount of the operating load L of the electrical oil pump 10e in the high-pressure mode is increased and the high-pressure mode is continued for a longer period in such a specific vehicle condition (dashed-dotted line).

In this way, the drop of the line pressure PL caused by the reverse rotation of the engine 1 can be further reduced as shown by broken line even in the specific vehicle condition, and the drop amount ΔPdrp of the line pressure PL can be prevented from exceeding the allowable drop amount ΔPallow even in the specified vehicle condition where the allowable drop amount ΔPallow decreases.

Next, functions and effects achieved by executing the above idle stop associated hydraulic control are described.

According to the idle stop associated hydraulic control, the electrical oil pump 10e is basically operated in the steady mode, in which the operating load L is set at the steady load Lnorm, during the idle stop. However, the electrical oil pump 10e is operated in the high-pressure mode, in which the operating load L is set at the load Lhi higher than the steady load Lnorm, for a predetermined period after the engine 1 stops rotating (forward rotation), specifically at least for a period during which the hydraulic pressure supplied to the low brake 32, i.e. the line pressure PL drops due to the reverse rotation of the engine 1 occurring immediately after the engine 1 stops rotating. In this way, the drop of the line pressure PL caused by the reverse rotation of the engine 1 can be reduced, the transmission capacity of the low brake 32 can be increased by quickly increasing the line pressure PL even when a start request is made at a timing at which the line pressure PL drops, and good starting performance can be obtained.

Further, when the line pressure PL becomes lower than the high-pressure mode transition threshold value Plim, it is judged that the line pressure PL will drop and the electrical oil pump 10e is operated in the high-pressure mode. In this way, the electrical oil pump 10e can be operated in the high-pressure mode in accordance with the drop timing of the line pressure PL caused by the reverse rotation of the engine 1.

Further, the high-pressure mode transition threshold value Plim is set at the hydraulic pressure equal to or higher than the starting required pressure Prtn at which the low brake 32 starts generating the transmission capacity. In this way, the operation of the electrical oil pump 10e in the high-pressure mode can be started earlier than the drop of the line pressure PL caused by the reverse rotation of the engine 1 and the drop of the line pressure PL can be more reliably suppressed.

Further, the steady load Lnorm is set at the load necessary to increase the line pressure PL to the starting required pressure Prtn. In this way, fuel economy and quietness can be improved by suppressing the operating load of the electrical oil pump 10e to a low level while good starting performance is ensured for a period other than the dropping period of the line pressure PL caused by the reverse rotation of the engine 1.

Further, in the high-pressure mode, the operating load of the electrical oil pump 10e is increased until the drop amount ΔPdrp of the line pressure PL caused by the reverse rotation of the engine 1 becomes smaller than the allowable drop amount ΔPallow. In this way, a load increase amount of the electrical oil pump 10e in the high-pressure mode is suppressed to a minimum necessary level, whereby deterioration in fuel economy and quietness and a reduction in the life of the electrical oil pump 10e caused by increasing the operating load of the electrical oil pump 10e more than necessary can be suppressed.

If it is not problematic to operate the electrical oil pump 10e at a high load, the operating load of the electrical oil pump 10e may be increased until the drop amount ΔPdrp of the line pressure PL becomes zero or the electrical oil pump 10e may be operated at a maximum load. Alternatively, the electrical oil pump 10e may be operated in the high-pressure mode from the start of the idle stop.

Further, if the idle stop is performed in the specific vehicle condition where the allowable drop amount ΔPallow of the line pressure PL decreases, e.g. if the vehicle is on an uphill road or the transmission 4 is to be interlocked, a switch is made to the high-pressure mode at an earlier timing and the increase amount in the high-pressure mode and the duration of the high-pressure mode are increased. In this way, the switch timing of the high-pressure mode, the pressure increase amount in the high-pressure mode and the duration of the high-pressure mode are appropriately set according to the vehicle condition, and the drop amount ΔPdrp of the line pressure PL can be made smaller than the allowable drop amount ΔPallow even in the specific vehicle condition where the allowable drop amount ΔPallow decreases.

Further, according to the idle stop associated hydraulic control, a switch is invariably made to the high-pressure mode during the idle stop, but the allowable drop amount ΔPallow of the line pressure PL is relatively large when the specific vehicle condition is not set. Thus, a switch may be made to the high-pressure mode only when the idle stop is performed in the specific vehicle condition where the drop of the line pressure PL is particularly problematic. This can reduce the frequency of switching the electrical oil pump 10e to the high-pressure mode and further suppress deterioration in fuel economy and quietness and a reduction in the life of the electrical oil pump 10e caused by the operation of the electrical oil pump 10e at a high load.

Although the embodiment of the present invention has been described above, the above embodiment is merely illustration of one application example of the present invention and not of the nature to limit the technical scope of the present invention to the specific configuration of the above embodiment.

For example, although the high-pressure mode operating load Lhi, the high-pressure mode duration Thi and the high-pressure mode transition threshold value Plim are all increased when the vehicle is on an uphill road or when the transmission 4 is to be interlocked in the above embodiment, one or two of these parameters may be increased.

Further, although the electrical oil pump 10e is operated in the high-pressure mode for the period during which the line pressure PL, that is the hydraulic pressure supplied to the low brake 32, drops due to the reverse rotation of the engine 1 occurring immediately after the engine 1 stops rotating in the above embodiment, the function and effect of reducing the drop amount ΔPdrp of the line pressure PL are achieved if the electrical oil pump 10e is operated in the high-pressure mode at least for a part of this period. For example, the operation mode of the electrical oil pump 10e may be switched to the high-pressure mode after the elapse of a predetermined time after the stop of the engine 1 or the operation mode of the electrical oil pump 10e may be returned to the steady operation mode before the drop amount ΔPdrp of the line pressure PL becomes zero (during the drop).

Further, although a switch is made to the high-pressure mode when the line pressure PL, that is the hydraulic pressure supplied to the low brake 32, falls below the high-pressure mode transition threshold value Plim in the above embodiment, a switch may be made to the high-pressure mode based on a comparison between an elapsed time from the start of the fuel cut of the engine 1 and a threshold value. In this case, if the threshold value is made smaller in the specific vehicle condition, the switch timing to the high-pressure mode can be advanced in the specific vehicle condition.

Alternatively, a crank angle when the engine 1 stops rotating may be detected by a crank angle sensor and a switch may be made to the high-pressure mode when the detected crank angle is an angle at which the reverse rotation of the engine 1 occurs since whether or not the reverse rotation of the engine 1 occurs when the engine 1 stops rotating is substantially determined by the crank angle when the engine 1 stops rotating.

Further, the drive source of the vehicle may be a combination of the engine 1 and an electric motor. Further, the transmission 4 may be a stepped automatic transmission, a V-belt continuously variable transmission or a toroidal continuously variable transmission and, in this case, the starting frictional engagement element is a starting clutch of a forward/reverse switching mechanism.

For the above description, the contents of Japanese Patent Application No. 2010-52372 filed on Mar. 9, 2010 are hereby incorporated by reference.

The invention claimed is:

1. An automatic transmission to be combined with an engine which performs an idle stop, comprising:
   a mechanical oil pump which is driven by power of the engine;
   an electrical oil pump;
   a starting frictional engagement element to which a hydraulic pressure produced in the mechanical oil pump or the electrical oil pump is supplied; and
   an idle stop associated hydraulic control unit which operates the electrical oil pump in a steady mode, in which an operating load of the electrical oil pump is set at a steady load, during the idle stop, but operates the electrical oil pump in a high-pressure mode, in which the operating load of the electrical oil pump is set at a load higher than the steady load, for a predetermined period when the engine stops rotating.

2. The automatic transmission according to claim 1, wherein:
   the predetermined period is at least a period during which the hydraulic pressure supplied to the starting frictional engagement element drops due to the reverse rotation of the engine occurring immediately after the engine stops rotating.

3. The automatic transmission according to claim 1, further comprising a hydraulic pressure drop judging unit which judges whether or not the hydraulic pressure supplied to the starting frictional engagement element will drop when the hydraulic pressure supplied to the starting frictional engagement element falls below a predetermined hydraulic pressure, wherein:
   the idle stop associated hydraulic control unit operates the electrical oil pump in the high-pressure mode when a drop of the hydraulic pressure supplied to the starting frictional engagement element is judged by the hydraulic pressure drop judging unit.

4. The automatic transmission according to claim 3, wherein:
   the predetermined hydraulic pressure is set at a hydraulic pressure at which the starting frictional engagement element starts generating a transmission capacity.

5. The automatic transmission according to claim 1, wherein:
   the steady load is a load necessary to increase the hydraulic pressure supplied to the starting frictional engagement element to a hydraulic pressure at which the frictional engagement element starts generating a transmission capacity.

6. The automatic transmission according to claim 1, wherein:
   the idle stop associated hydraulic control unit increases the operating load of the electrical oil pump in the high-pressure mode until a drop of the hydraulic pressure supplied to the starting frictional engagement element becomes smaller than an allowable drop amount.

7. The automatic transmission according to claim 1, further comprising an idle stop vehicle condition judging unit which judges whether or not the idle stop is to be performed in a specific vehicle condition where an allowable drop amount of the hydraulic pressure supplied to the starting frictional engagement element decreases, wherein:
   the idle stop associated hydraulic control unit switches the electrical oil pump from the steady mode to the high-pressure mode at an earlier timing than otherwise when it is judged that the idle stop is to be performed in the specific vehicle condition by the idle stop vehicle condition judging unit.

8. The automatic transmission according to claim 1, further comprising an idle stop vehicle condition judging unit which judges whether or not the idle stop is to be performed in a specific vehicle condition where an allowable drop amount of the hydraulic pressure supplied to the starting frictional engagement element decreases, wherein:
   the idle stop associated hydraulic control unit sets a longer duration of the high-pressure mode than otherwise when it is judged that the idle stop is to be performed in the specific vehicle condition by the idle stop vehicle condition judging unit.

9. The automatic transmission according to claim 1, further comprising an idle stop vehicle condition judging unit which judges whether or not the idle stop is to be performed in a specific vehicle condition where an allowable drop amount of the hydraulic pressure supplied to the starting frictional engagement element decreases, wherein:
   the idle stop associated hydraulic control unit switches the electrical oil pump from the steady mode to the high-pressure mode only when it is judged that the idle stop is to be performed in the specific vehicle condition by the idle stop vehicle condition judging unit.

10. The automatic transmission according to claim 1, further comprising an idle stop vehicle condition judging unit which judges whether or not the idle stop is to be performed in a specific vehicle condition where an allowable drop amount of the hydraulic pressure supplied to the starting frictional engagement element decreases, wherein:
    the idle stop associated hydraulic control unit sets a larger increase amount of the operating load of the electrical oil pump in the high-pressure mode than otherwise when it is judged that the idle stop is to be performed in the specific vehicle condition by the idle stop vehicle condition judging unit.

11. The automatic transmission according to claim 10, wherein:
    the specific vehicle condition is a condition where the vehicle is on an uphill road.

12. The automatic transmission according to claim 10, wherein:
the specific vehicle condition is a condition where the automatic transmission is to be interlocked.

13. The automatic transmission according to claim 10, wherein:
the specific vehicle condition includes a condition where the vehicle is on an uphill road, a condition where the automatic transmission is to be interlocked and a condition where the vehicle is on an uphill road and the automatic transmission is to be executed; and
the idle stop associated hydraulic control unit sets a largest increase amount in increasing the operating load of the electrical oil pump in the high-pressure mode in the specific vehicle condition when the vehicle is on an uphill road and the automatic transmission is to be interlocked.

14. The automatic transmission according to claim 10, wherein:
the specific vehicle condition includes a condition where the vehicle is on an uphill road, a condition where the automatic transmission is to be interlocked and a condition where the vehicle is on an uphill road and the automatic transmission is to be executed; and
the idle stop associated hydraulic control unit switches the electrical oil pump from the steady mode to the high-pressure mode at an earliest timing in the specific vehicle condition when the vehicle is on an uphill road and the automatic transmission is to be interlocked.

15. The automatic transmission according to claim 10, wherein:
the specific vehicle condition includes a condition where the vehicle is on an uphill road, a condition where the automatic transmission is to be interlocked and a condition where the vehicle is on an uphill road and the automatic transmission is to be executed; and
the idle stop associated hydraulic control unit sets a longest duration of the high-pressure mode in the specific vehicle condition when the vehicle is on an uphill road and the automatic transmission is to be interlocked.

16. A hydraulic control method for an automatic transmission to be combined with an engine which performs an idle stop and including a mechanical oil pump which is driven by power of the engine, an electrical oil pump, and a starting frictional engagement element to which a hydraulic pressure produced in the mechanical oil pump or the electrical oil pump is supplied, comprising:
operating the electrical oil pump in a steady mode, in which an operating load of the electrical oil pump is set at a steady load, during the idle stop, but operating in a high-pressure mode, in which the operating load of the electrical oil pump is set at a load higher than the steady load, for a predetermined period when the engine stops rotating.

17. An automatic transmission to be combined with an engine which performs an idle stop, comprising:
a mechanical oil pump which is driven by power of the engine;
an electrical oil pump;
a starting frictional engagement element to which a hydraulic pressure produced in the mechanical oil pump or the electrical oil pump is supplied; and
idle stop associated hydraulic control means for operating the electrical oil pump in a steady mode, in which an operating load of the electrical oil pump is set at a steady load, during the idle stop, but operating the electrical oil pump in a high-pressure mode, in which the operating load of the electrical oil pump is set at a load higher than the steady load, for a predetermined period when the engine stops rotating.

* * * * *